(12) United States Patent
Crass

(10) Patent No.: US 11,489,795 B2
(45) Date of Patent: Nov. 1, 2022

(54) SYSTEMS AND METHODS FOR PROVIDING CONTACT AND INFORMATION EXCHANGE AND MANAGEMENT THEREOF

(71) Applicant: PINME, LLC, Nashville, TN (US)

(72) Inventor: Chris Crass, Nashville, TN (US)

( * ) Notice: Subject to any disclaimer, the term of this patent is extended or adjusted under 35 U.S.C. 154(b) by 0 days.

(21) Appl. No.: 17/424,579

(22) PCT Filed: Jan. 21, 2020

(86) PCT No.: PCT/US2020/014377
§ 371 (c)(1),
(2) Date: Jul. 21, 2021

(87) PCT Pub. No.: WO2020/154271
PCT Pub. Date: Jul. 30, 2020

(65) Prior Publication Data
US 2022/0103494 A1   Mar. 31, 2022

Related U.S. Application Data

(60) Provisional application No. 62/794,886, filed on Jan. 21, 2019.

(51) Int. Cl.
*G06F 15/16* (2006.01)
*H04L 51/046* (2022.01)
(Continued)

(52) U.S. Cl.
CPC ........... *H04L 51/046* (2013.01); *G06Q 50/01* (2013.01); *H04L 51/52* (2022.05)

(58) Field of Classification Search
CPC ...... H04L 51/046; H04L 51/32; H04L 63/102
(Continued)

(56) References Cited

U.S. PATENT DOCUMENTS

2013/0179948 A1* 7/2013 Ho ..................... G06Q 30/0631
                                                                 726/4
2014/0082088 A1* 3/2014 Ye ........................ H04L 65/403
                                                                 709/204
(Continued)

FOREIGN PATENT DOCUMENTS

KR          20040034060 A      4/2004

OTHER PUBLICATIONS

International Search Authority: Korean Intellectual Property Office search report for corresponding International Patent Application No. PCT/US2020/014377, 10 pages.

*Primary Examiner* — Wing F Chan
*Assistant Examiner* — Andrew Woo
(74) *Attorney, Agent, or Firm* — Patterson Intellectual Property Law, P.C.

(57) ABSTRACT

Systems, apparatuses, and methods are provided for a contact and information exchange and management system. The system includes a network, a server coupleable to the network, and a plurality of electronic devices coupleable to the network. Each electronic device includes an application module executable by the processor to perform a plurality of operations, including obtaining at least one set of information relating to a first user of a first electronic device of the plurality of electronic devices, receiving a selection of shareable information from the first user of the first electronic device, transmitting an indication of the shareable information from the first electronic device via the communication module of the first electronic device to the server, and obtaining the shareable information at a second electronic device of the plurality of electronic devices from the server via the communication module of the second electronic device.

15 Claims, 12 Drawing Sheets

(51) Int. Cl.
*G06Q 50/00* (2012.01)
*H04L 51/52* (2022.01)

(58) Field of Classification Search
USPC .................................................. 709/204, 206
See application file for complete search history.

(56) References Cited

U.S. PATENT DOCUMENTS

| | | |
|---|---|---|
| 2014/0090091 A1 | 3/2014 | Prakash et al. |
| 2014/0372485 A1 | 12/2014 | Crumrine |
| 2016/0285884 A1 | 9/2016 | Seaward et al. |
| 2017/0012987 A1 | 1/2017 | Gupta |

* cited by examiner

SYSTEMS AND METHODS FOR PROVIDING CONTACT AND INFORMATION EXCHANGE AND MANAGEMENT THEREOF

TECHNICAL FIELD

The present disclosure relates generally to systems and methods for providing contact and information exchange and management thereof.

BACKGROUND ART

Personal contact information exchange has been and continues to be an important aspect of staying connected to others. Historically, contact information such as mailing address and phone number has been manually exchanged between physically proximate individuals. Interpersonal networking is an important part of professional and personal development. Many people exchange business cards and phone numbers upon initially meeting. However, it is time consuming to enter all of an individual's contact information and the like on one's smart device. However, if a person fails to record contact information after meeting someone, he or she might forget about that individual, which can be embarrassing a subsequent time the individuals meet. Alternatively, the contact information may be misplaced or lost if not immediately entered.

More recently, electronic exchange of contact information has supplanted the former manual exchange practice. For example, contact information exchange may occur by electronic communication such as SMS messaging, e-mail, or local wireless ad-hoc network data transfer using a protocol such as Bluetooth. However, electronic exchange of contact information suffers problems associated with contact information permanence and control, relating to a providing user not being able to control access to exchanged contact information after the exchange, and the receiving user not being able to ensure permanence of the exchanged contact information after the exchange, for example in the event of to a new device or corrupted contact list. Attempts to provide improved electronic exchange of contact information suffer similar problems. Some systems permit a user to create virtual business cards including predefined contact information. These virtual business cards may be exchanged via e-mail or other form of exchange, such as QR code scanning. However, like traditional electronic contact exchange, these systems traditionally function as a one-time information exchange, incapable of later access or control over the exchanged information by a providing entity.

Further, there is an abundance of other information available on the Internet about the person whom one has initially met, such as through Facebook and LinkedIn. However, a convenient way of accessing and storing the information, along with the contact information, is currently unavailable.

DISCLOSURE OF THE INVENTION

Embodiments of the present invention provide apparatuses, systems, and methods for providing contact and information exchange and management thereof.

Implementations consistent with the present disclosure provide systems, apparatuses, and methods permitting electronic information exchange between a plurality of users or entities. An application may be executed on a smartphone or other electronic device for exchanging and cataloging contact information and additional non-contact information. A user of the application may have control over ongoing access to and control of one or more sets of information relating to that user or to another user or entity. A set of contact information may be associated with an application user, such as a telephone number (although any information conveying an identity, identifier, or information associated with a user or user device may be used). In one example, a user may enter a specific phone number of another user into the application and the application may responsively populate an authorized set of information regarding the user associated with that specific phone number (although other forms of exchange are provided herein).

In various embodiments, a user may receive a telephone number from another user and enter that telephone number into his or her smart device. At least one set of predetermined and/or dynamically determined information relating to the sending user may be transmitted (e.g., automatically retrieved) and may be populated by the receiving user's electronic device or one or more services associated with the receiving user. Methods consistent with the present disclosure may enable a user to associate a person with a set of contact information (e.g., telephone number or other identifier) without requiring the user to manually enter the set of contact information manually. Further, once the two users are connected through the PINme application, the application may allow each user to send each other messages, files, photos, or any other information or data. In various embodiments, systems consistent with the present disclosure may enable location tracking of a user or user device by another user or entity.

According to an aspect of the present disclosure, provided is an electronic device for accessing a contact and information exchange and management system. The electronic device includes a communication module coupleable to a network, a processor, and an application module executable by the processor to perform a plurality of operations. The operations include (i) obtaining at least one set of information relating to at least one of a user of the electronic device or the electronic device, (ii) receiving a selection of shareable information from the user of the electronic device, and (iii) transmitting an indication of the shareable information from the electronic device via the communication module of the electronic device.

A second aspect of the present disclosure provides a system for providing contact and information exchange and management. The system includes a network, a server coupleable to the network, and a plurality of electronic devices coupleable to the network. Each of the plurality of electronic devices includes a communication module communicatively coupleable to the network, a processor, and an application module executable by the processor to perform a plurality of operations, including (i) obtaining at least one set of information relating to a first user of a first electronic device of the plurality of electronic devices, (ii) receiving a selection of shareable information from the first user of the first electronic device, (iii) transmitting an indication of the shareable information from the first electronic device via the communication module of the first electronic device to the server, and (iv) obtaining the shareable information at a second electronic device of the plurality of electronic devices from the server via the communication module of the second electronic device.

A further aspect of the present disclosure provides a method for providing a contact and information exchange and management system. The method includes obtaining at least one set of information relating to at least one of a user of an electronic device of the contact and information exchange and management system or the electronic device, receiving a selection of shareable information from the user of the electronic device, and transmitting an indication of the shareable information from the electronic device via a communication module of the electronic device.

Numerous other objects, features, and advantages of the present invention will be readily apparent to those skilled in the art upon a reading of the following disclosure when taken in conjunction with the accompanying drawings.

BEST MODE FOR CARRYING OUT THE INVENTION

Figure 1:
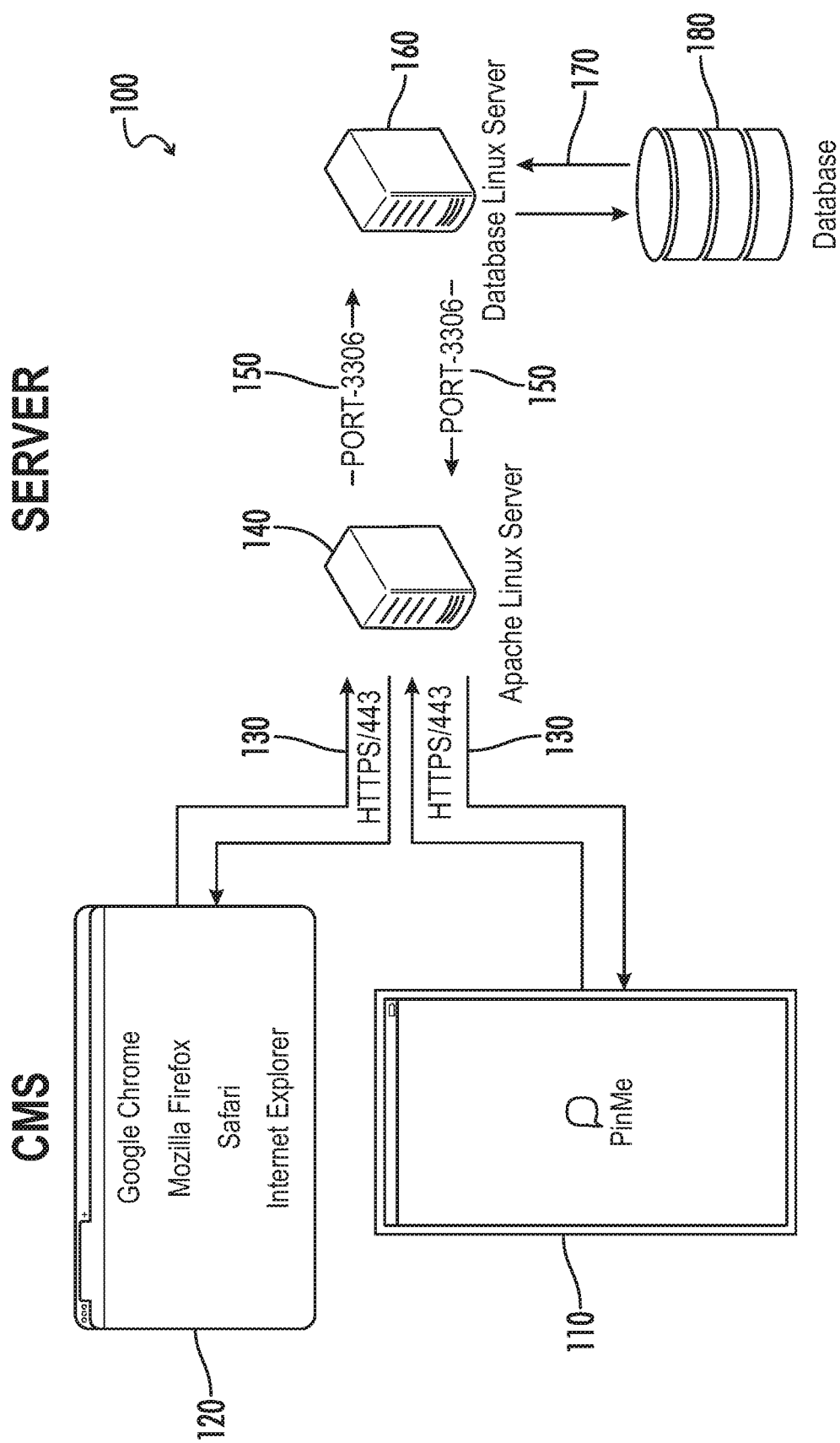
FIG. 1 illustrates an exemplary embodiment of a functional network diagram of a system according to aspects of the present disclosure.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-12, various exemplary apparatuses, systems, and methods according to the present disclosure are described in detail. Where the various figures may describe embodiments sharing various common elements and features with other embodiments, similar elements and features are given the same reference numerals and redundant description thereof may be omitted below.

Various embodiments of an apparatus according to the present invention may provide apparatuses, systems, and methods for providing contact and information exchange and management thereof.

FIG. 1 illustrates an exemplary embodiment of a functional network diagram of a system 100 according to aspects of the present disclosure. A system 100 includes one or more of an application 110 (e.g., via PINme application module 330 described herein), a web interface 120, a backend server 140, and/or a database server 160. At least one of the application 110 and/or the web interface 120 may be associated with a content management system (CMS). Furthermore, at least one of the application 110 and/or the web interface 120 may be configured to communicate with the backend server 140 via one or more communication links 130. Each of the communication links 130 may be configured to convey information between the application 110 or web interface 120 and the backend server 140 via at least one of a wired and/or wireless network (e.g., via network 390 described herein). In one exemplary embodiment, at least one of the application 110 and web interface 120 is configured to communicate with the backend server 140 via secure HTTP connection therebetween operating on port 443. Although described with reference to port 443, it should be appreciated that any communication port and/or method may be used within the scope of the present disclosure to enable communications between the application 110 or web interface 120 and the backend server 140 in various embodiments.

The backend server 140 may be configured to communicate with the database server 160 via one or more communication links 150 (e.g., via port 3306). In one or more embodiments, the backend server 140 and the database server 160 may be implemented at a single physical and/or virtual server, whereby at least one communication may be provided therebetween via one or more local and/or remote connections (e.g., via a local conductive bus, an Internet-based connection, or any other network configuration or plurality of network configurations). The database server 160 may include or otherwise be configured to communicate with a database 180 via at least one physical and/or virtual link 170. In various exemplary embodiments, two or more of the backend server 140, the database server 160, and the database 180 are implemented by a single physical or virtual server system.

Figure 2:
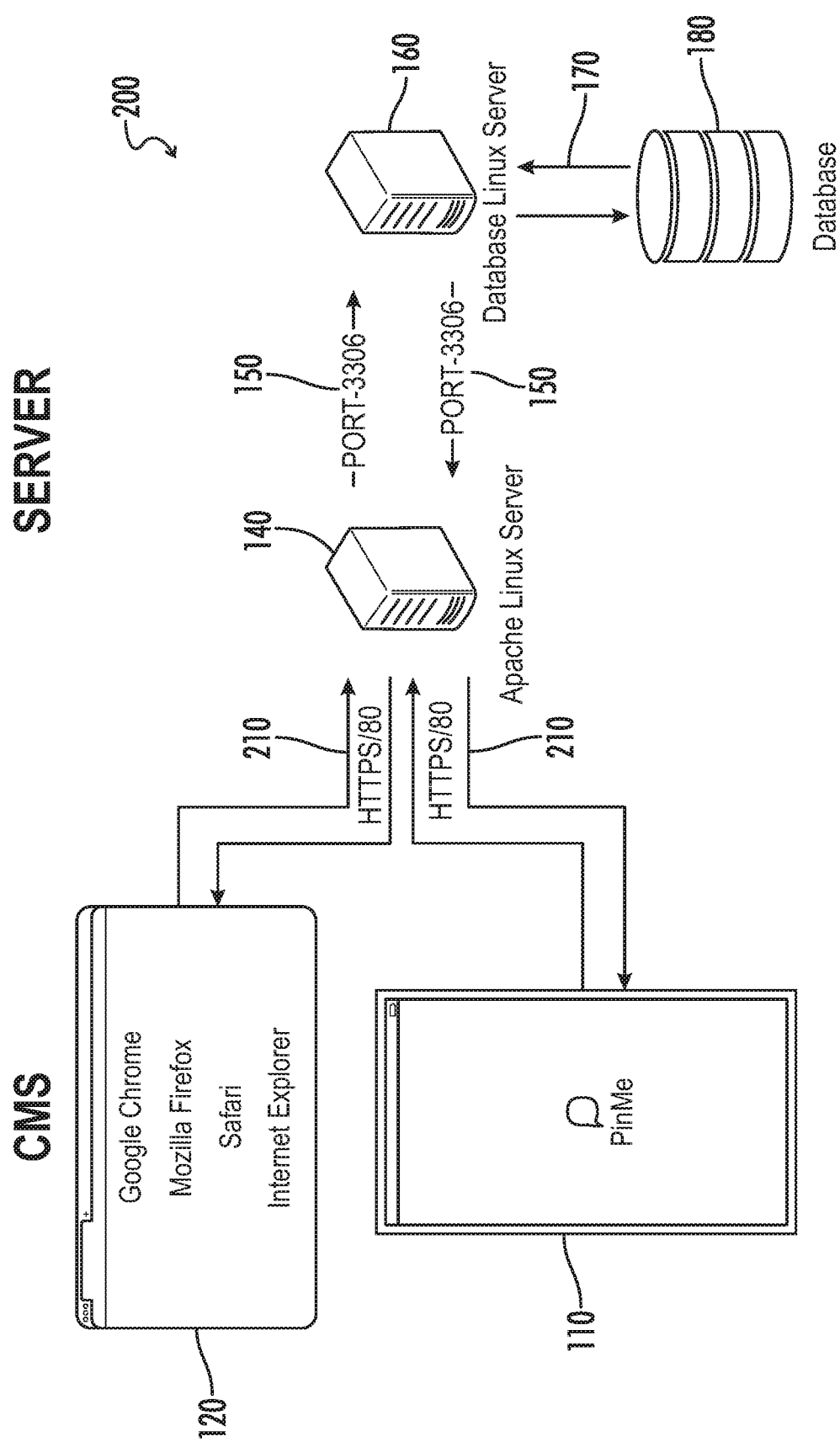
FIG. 2 illustrates an exemplary embodiment of an alternative network diagram of a system according to aspects of the present disclosure.

FIG. 2 illustrates an exemplary embodiment of an alternative network diagram of a system according to aspects of the present disclosure. The system 200 includes a plurality of elements described above with reference to FIG. 1 and further described below with reference to FIG. 3. FIG. 2 provides alternative communication link(s) between the application 110 and/or web interface 120 and the backend server 140. Specifically, FIG. 2 illustrates an embodiment where communications between at least one of the application 110 and/or web interface 120 occurs via at least one communication link 210. The communication link 210 may be an HTTP port 80 connection established along a wired and/or wireless physical network configuration.

Additional information relating to communications between the entities illustrated in FIGS. 1 and 2 are further described below, for example, with reference to FIG. 3.

Figure 3:
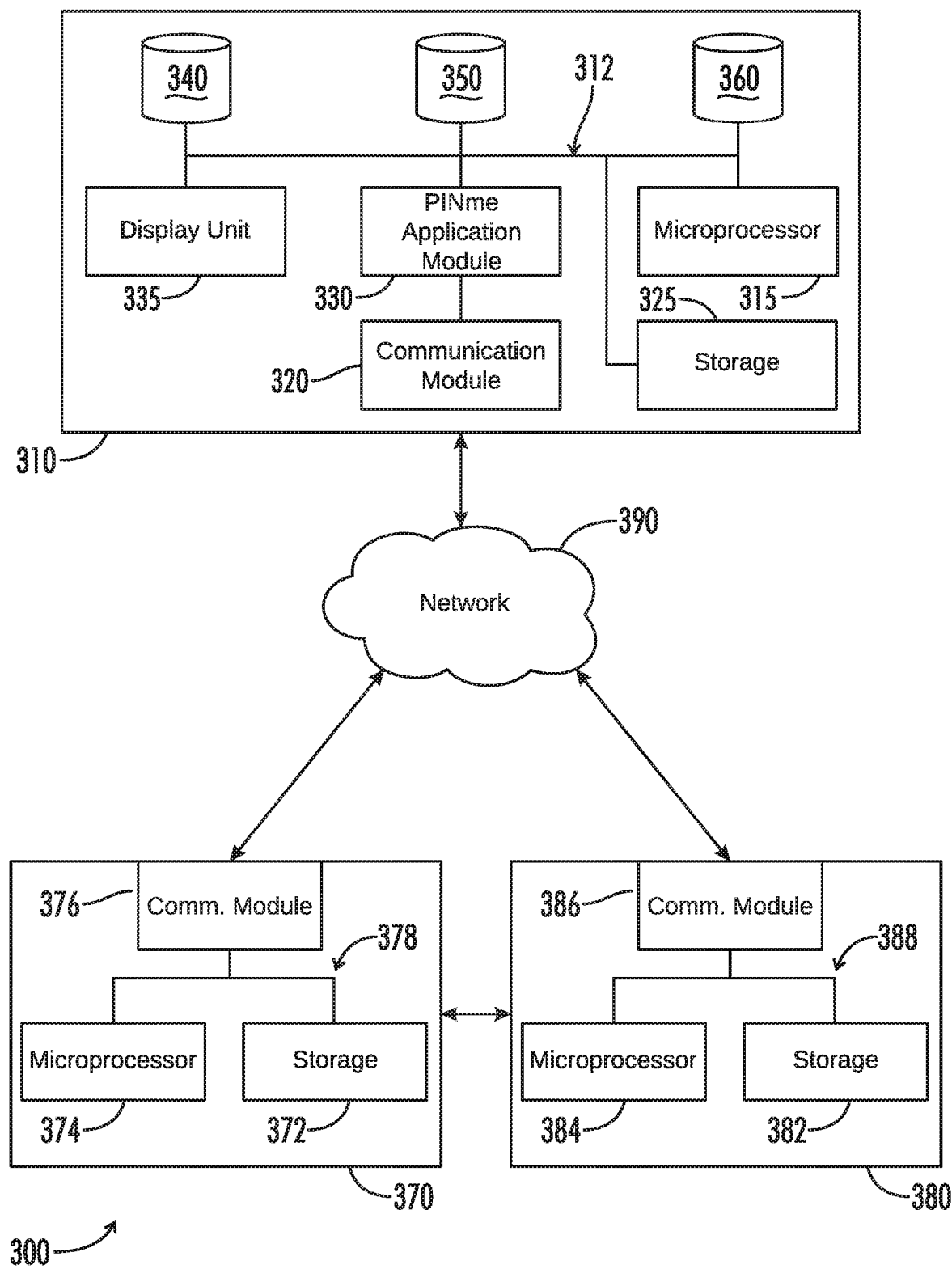
FIG. 3 illustrates an exemplary embodiment of a block diagram of a system according to aspects of the present disclosure.

FIG. 3 illustrates a block diagram of a system 300 in accordance with an exemplary embodiment. The system 300 includes at least one of an electronic device 310, a backend server 370, and a database server 380. Each of the electronic device 310, the backend server 370, and the database server 380 may be connected to a network 390. In one exemplary embodiment, the network 390 includes the Internet, a public network, a private network, or any other communications medium capable of conveying electronic communications. Connection between a communication module 320 of the electronic device 310 and the network 390 is configured to be performed by wired interface, wireless interface, or a combination thereof, without departing from the spirit and the scope of the present disclosure. In one exemplary operation, the electronic device 310 is configured to store one or more sets of instructions in a storage 325. The one or more sets of instructions may be configured to be executed by a microprocessor 315 of the electronic device 310 to perform operations corresponding to the one or more sets of instructions.

In various exemplary embodiments, the electronic device 310 is implemented as at least one of a desktop computer, a laptop computer, a smart phone, a smart device, or any other electronic device capable of executing instructions. The microprocessor 315 may be a generic hardware processor, a special-purpose hardware processor, or a combination thereof. In embodiments having a generic hardware processor (e.g., as a central processing unit (CPU) available from manufacturers such as Intel and AMD), the generic hardware processor is configured to be converted to a special-purpose processor by means of being programmed to execute and/or by executing a particular algorithm in the manner discussed herein for providing a practical application of any underlying algorithm, step, or function to provide a specific operation or result.

The electronic device 310 is configured in various embodiments to be associated with a mobile user, and is capable of being transported, either during operation or while powered off. In one embodiment where the electronic device 310 is a cellular telephone, smartphone, or smart device, the electronic device 310 is at least temporarily located at a position associated with a user. In various embodiments, the electronic device 310 is configured to operate remotely, and is configured to obtain or otherwise operate upon one or more instructions stored physically remote from the electronic device 310 (e.g., via client-server communications, cloud-based computing, or any distributed computing environment or network).

The electronic device 310 includes at least one of a profile storage 340, a data cache 350, and operational data storage 360. Although described with reference to profile storage, data cache, and operational data storage, it should be appreciated that one or more of the elements 340, 350, and 360 may include any type of information or metadata relating to any set of data. For example, in one exemplary embodiment, the elements 340, 350, and/or 360 may be configured, either alone or in combination, to store one or more sets of data or metadata relating to profile and/or operational data, or any other set of data or metadata associated with the electronic device 310 or PINme system. Furthermore, although described with reference to three separate databases, it should be appreciated that two or more of the enumerated databases may be physically and/or logically stored in a single hardware and/or virtual storage element. Still further, one or more of the elements 340, 350, and/or 360 may be implemented in whole or in part by a distributed or cloud-based storage, without departing from the spirit and the scope of the present disclosure. One or more of the profile storage 340, the data cache 350, and/or the operational data storage 360 may be coupled to at least one other component via a bus 312. The bus 312 may be a conductive path in one exemplary embodiment, however any means of conveying at least a portion of a signal between two or more of the profile storage 340, the data cache 350, and/or the operational data storage 360 may be used as the bus 312 without departing from the spirit and the scope of the present disclosure.

The electronic device 310 may include a display unit 335. The display unit 335 is embodied as a part of the electronic device 310 in one embodiment and is configured to be either wired to or wirelessly-interface with one or more other devices. The display unit 335 may be configured to operate, at least in part, based upon one or more operations of the PINme application module 330, as executed by the microprocessor 315. Although operable using the display unit 335 of electronic device 310, the PINme application module 330 may be capable of executing and operating using a plurality of devices. For example, one or more electronic devices 310 may be at a smart phone, tablet, laptop computer, or one or more computing devices, each having different microprocessors 315, screen resolutions, memory sizes, etc., but each being capable of executing the PINme application module 330 after download and/or installation of at least a port of the PINme application module 330 from the backend server 370. Additionally or alternatively, at least a portion and/or an entirety of the PINme application module 330 include be, in whole or in part, a network-accessible interface accessible to one or more devices.

The backend server 370 is configured to perform one or more operations corresponding to the PINme application module 330. Although illustrated as a single server, the backend server 370 may be implemented as a plurality of servers or server elements, any of which may be located either within a single computing element or a plurality of computing elements. In one exemplary embodiment, the backend server 370 is configured to store at least a portion of an executable file, a portion of computer code, processing elements, and/or other information associated with the PINme application module 330, such that at least a portion of data associated with the PINme application module 330 is transmitted to or from the backend server 370 at least one of to or from the electronic device 310 via the network 390. For example, the backend server 370 may perform one or more functions corresponding to an application store configured to provide an executable copy of the PINme application module 330 to the electronic device 310, either automatically or in response to a download request. Additionally or alternatively, at least a portion or the entirety of the PINme application module 330 may be obtained from or otherwise accessible from a third-party, such as an application store or other application repository.

The backend server 370 may, in one exemplary embodiment, include a storage 372 configured to store at least a portion of data corresponding to the PINme application module 330. In one embodiment, the at least a portion of data corresponding to the PINme application module 330 may include an executable or installable file, a data set, a set of information, or any other data or information useable by the electronic device 310 while executing the PINme application module 330 or on association with the PINme application module 330. The at least one portion of data may contain or embody a link or other association with at least one file located remotely from the backend server 370 or other data source. A microprocessor 374 of the backend server 370 is configured to execute one or more set of instructions in a manner similar to that described above with relation to microprocessor 315. The backend server 370 may further include a communication module 376. The communication module 376 may be configured to communicate via the network 390, for example using at least one of a wired and/or wireless communication path. One or more of the storage 372, the microprocessor 374, and the communication module 376 may be coupled via a bus 378. The bus 378 may be a conductive path in one exemplary embodiment, however any means of conveying at least a portion of a signal between two or more of the storage 372, the microprocessor 374, and/or the communications module 376 may be used as the bus 378 without departing from the spirit and the scope of the present disclosure.

The system 300 may further include at least one database server 380. The database server 380 may be configured to transmit and/or receive data relating to the PINme application module 330 in various embodiments. The database server 380 may include a storage 382, configured to store at least one of computer instructions and/or data or metadata associated with the PINme application module 330 and/or one or more electronic devices 310. A microprocessor 384 of the database server 380 is configured to execute one or more set of instructions in a manner similar to that described above with relation to microprocessor 315. The database server 380 may further include a communication module 386. The communication module 386 may be configured to communicate via the network 390, for example using at least one of a wired and/or wireless communication path. One or more of the storage 382, the microprocessor 384, and the communication module 386 may be coupled via a bus 388. The bus 388 may be a conductive path in one exemplary embodiment, however any means of conveying at least a portion of a signal between two or more of the storage 382, the microprocessor 384, and/or the communications module 386 may be used as the bus 388 without departing from the spirit and the scope of the present disclosure.

The PINme application module 330 may be used in various embodiments to enable a user and/or entity to provide a set of user information. The user information may include one or more sets of user information profiles. User information profiles may include information pertaining to a user including, for example, a telephone number, e-mail address, mailing address, social media account profile information, subset of social media account profile information, electronic payment profile information or subset thereof, or any other set of information associated with a user and/or user device. Although described with reference to a user, it should be appreciated that one or more sets of information and/or a user itself may relate in whole or in part to a user, a company, or any other entity, either alone or in combination. A user of the PINme application module 330 may enter at least one set of information relating to the user, a user device, a user preference, or any other information to be associated with the user, a user device, or another user or entity. At least a portion of information associated with a user, entity, and/or user or entity device may be stored in at least one of the electronic device 310, the backend server 370, and/or a third-party storage entity such as an internet-connected storage provider, cloud-based storage network, or the like.

The user of the PINme application module 330 may be provided with one or more options for associating at least one set of information with a profile. The profile may be associated with at least one of the user and/or a user device. In one exemplary embodiment, a user may be enabled to create, modify, and/or remove at least a portion of a profile. One or more profiles may relate, for example, to personal information, personal contact information, business information, business contact information, at least one advertising metric, a customizable set of information and/or or contact information, or any other set or configuration of information.

In an exemplary embodiment, the PINme application module 330 is configured to permit a user to create predefined and dynamic sets of profile information. The sets of profile information may include contact information, personal information, and/or social media information. For example, during a registration process, an installation process, or otherwise as a function of the PINme application module 330 a user may provide a selection of one or more information sets to be associated with a particular profile. In one embodiment, the PINme application module 330 may have a plurality of predefined and/or customizable profiles which may import predetermined and/or user-selectable information. In operation, a user of the PINme application module may be provided with the ability to enter personal information, personal contact information, business information, business contact information, and/or social media information. At least one of the PINme application module 330 and/or backend server 370 may be configured to automatically populate at least one set of user-provided or dynamically obtained information into at least one profile. The PINme application module 330 may further optionally permit a user to create one or more profiles and/or edit at least one profile or set of information associated with a profile, for example via a graphical user interface.

When a user wishes to exchange information with another PINme user or entity, the user may select at least one set of information associated with at least one of the user and/or a user device to convey to a receiving user or entity. For example, a user may have entered a personal telephone number, a business telephone number, a personal e-mail address, a business e-mail address, a Facebook account identifier, a Twitter account identifier, and a Venmo account identifier, each of which may be stored or otherwise accessible via the database server 380 (e.g., via the backend server 370). The user's personal telephone number and personal e-mail address may be automatically provided to a personal information profile, the user's business telephone number and business e-mail address may be added to the user's business profile information, and the user's Facebook, Twitter, and Venmo information may be added to a social media profile. Although described with reference to Facebook, Twitter, and Venmo, it should be appreciated that information may be from any source, including and public or private interface, any social media provider or storage, or any other information accessible to or by the electronic device 310 and/or capable of exchange to/with the electronic device 310. For example, any social media provider may be used according to the present disclosure. Additionally or alternatively, the user may selectively move or modify information associated with one or more profiles and may optionally create new customized profiles which include one or more predetermined and/or user-selected sets of information.

In various embodiments, a user of the PINme application module 330 may be permitted to exchange at least one set of information using a variety of methods. For example, a user may transmit and/or receive at least one set of information based upon a facial recognition operation of the PINme application module 330 and/or an external provider. Information may likewise be transmitted or obtained by a QR or any other scannable or image-recognizable element via the PINme application module 330 and/or external provider. The PINme application module 330 may further include voice-based identification and/or analysis to perform one or more operations, including contact information exchange and/or identification. Fingerprint scanning may also be used to perform one or more operations including contact information exchange and/or identification. The PINme application module 330 may be configured to perform at least one or all of the functions of an operating system in relation to an electronic device 310 according to various embodiments. For example, a user or entity may be provided with a single account which may be accessible across a subset or all electronic devices 310 capable of executing at least a portion of the PINme application module 330, whereby any or all of functionality of the electronic device 310 is controlled, in whole or in part, by instructions provided by or in association with the PINme application module 330.

When selecting what information to provide to another user or entity, a user may be provided with a visual selection interface displaying one or more sets of shareable information. The user may select one or more of the sets of shareable information to be conveyed with the other user or entity. An indication of the user-selected information conveyed to the other user or entity may be stored, for example at the database server 380 and/or backend server 370. After selection, the selecting user may modify the shared information, for example by adding information not previously provided to the receiving user or entity, or by removing one or more sets of information previously provided to the receiving user or entity. For example, if a first user previously shared his or her personal e-mail address and Facebook account information with a receiving user, the first user may later remove access to the previously shared information via the PINme application module 330 and/or may select additional sets of information to be provided to the receiving user. The first user may also edit one or more sets of information in various embodiments. Because all shared information is linked between both the first user and the receiving user, complete control over each user or entity's shared information may be dynamically tracked and updated in real-time.

At least one set of information and/or association between user(s) and the at least one set of information may be stored at the database server 380, for example at the storage 382 thereof. The backend server 370 may be configured to convey the at least one set of information and/or the association between user(s) and the at least one set of information to the database server 380 via the network 390 and/or directly to between the backend server 370 and the database server according to communication between the communication module 376 and the communication module. Additionally or alternatively, the backend server 370 and the database server 380 may be implemented via a single physical or logical server in which case communication between the backend server 370 and the database server 380 may be implemented via a direct connection such as a conductive bus or logical interface used to convey information.

In one embodiment, when a request is received to provide information between a first user and a receiving user, the request is provided to the backend server 370. The backend server may then obtain requested information from the database server 380 and/or may be configured to receive a portion or the entire set of information from a third party, optionally according to linking information provided by the database server 380 to the backend server 370. For example, in one embodiment, the database server may store a collection of links or access information relating to at least one set of information to be conveyed between users or entities. The database server 380 for example may associate a set of user information with a third party, such as a social media provider. The database server 380 may directly access the third party via a link or access information using an application programming interface (API) or other mechanism for obtaining linked user information. Linked user information may include one or more user account parameters capable of being used to retrieve one or more sets of third-party data from one or more third parties. For example, in the case of social media accounts, the database server 380 may store at the storage 382 thereof user profile information sufficient to be used to obtain at least one set of information associated with a user of the PINme application module 330. The database server 380 may be configured to directly obtain one or more sets of information directly from the third party using the stored user profile information (e.g., via an API) or may convey information to the backend server 370 sufficient for such information to be obtained by the backend server 370. Additionally or alternatively, the database server 380 may be configured to collect one or more sets of information from third parties at a periodic or non-periodic interval and store at least a portion of representation thereof (e.g., functioning as a cache or snapshot database thereof for use by the PINme system). The database server 380 may be configured to provide one or more sets of information to the backend server 370 and/or may be configured to provide the one or more sets of information directly to a user's electronic device 310 in various embodiments. Furthermore, in various exemplary embodiments, the PINme application module 330 of an electronic device 310 may be configured to directly query at least one of the database server 380 and/or a third party to obtain information.

Figure 4:
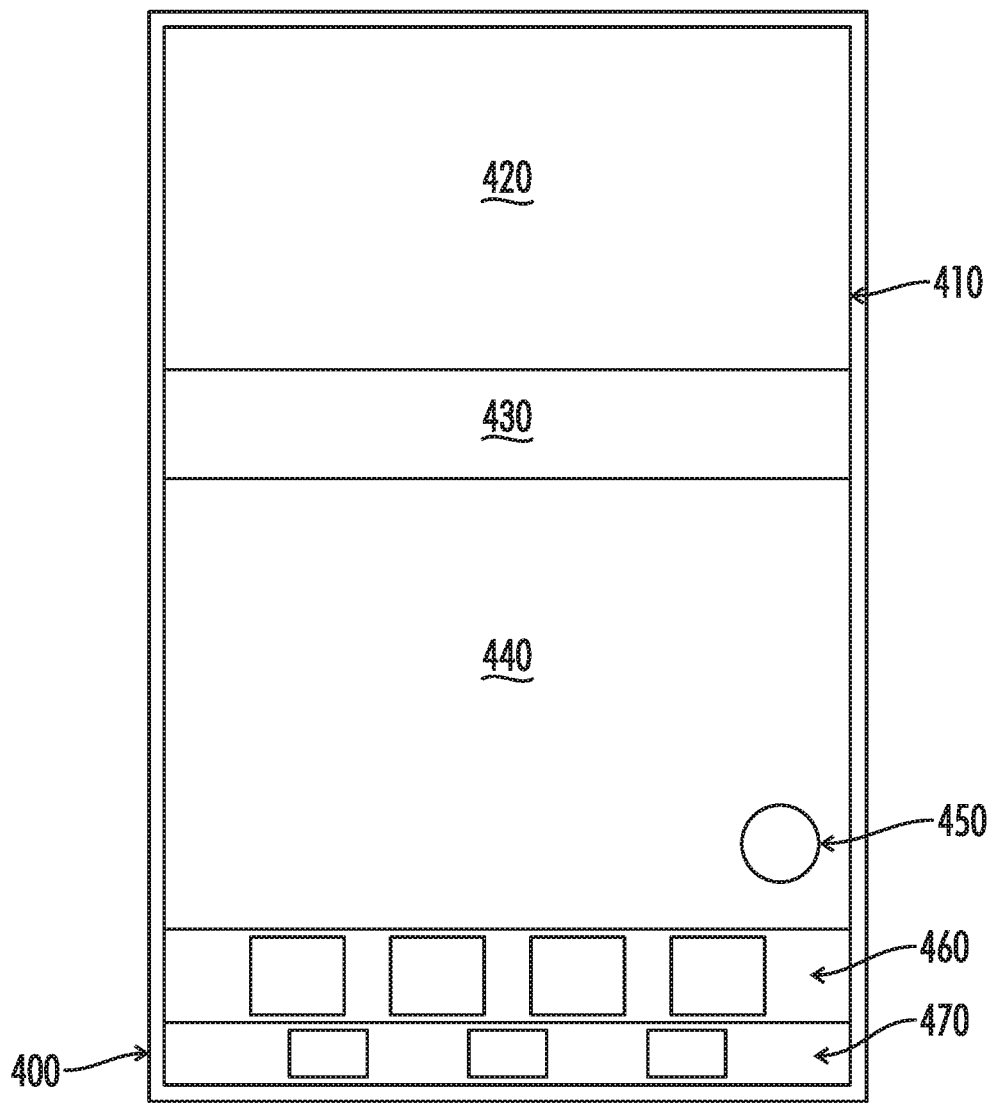
FIG. 4 illustrates an exemplary embodiment of a contact management section according to aspects of the present disclosure.

FIG. 4 illustrates an exemplary embodiment of a contact management section according to aspects of the present disclosure. The device 400 includes a graphical user interface (GUI) provided, for example by the PINme application module 330 on an electronic device 310 via the display unit 335. The device 400 is configured to provide an interface 410 having one or more of a heading 420, a search module 430, a contact list 440, an operation trigger 450, a menu 460, and/or a default operating menu 480. The heading 420 may be used to convey, for example, information regarding at least one set of information regarding contacts, contact information, and/or operational information relating to the interface 410. The search module 430 is configured to provide a search function regarding at least one of contacts associated with a user and/or user device. For example, the search module 430 may be configured to provide a search function amongst contact names and/or information in various embodiments. During operation, a result of a search performed using the search module may be provided in the contact list 440 and/or a separate interface to convey search results to a user based on one or more search criteria. The contact list 440 is optionally configured to provide a set of information and/or metadata relating to one or more contacts or contact information associated with a user or entity associated with the device 400. The operation trigger 450 is configured to enable at least one operation. Operations corresponding to the operation trigger 450 may include, for example, a contact add function, a contact modification function, a remove contact function, or any other function in association with at least one of a contact and/or metadata associated with a contact. The menu 460 may include a plurality of user-selectable operations. The default operating menu 470 may be provided by an operating system of a device 400 upon which the PINme application module 330 is executing (e.g., an Android operating system, an iOS operating system, or any other device operating system).

Figure 5:
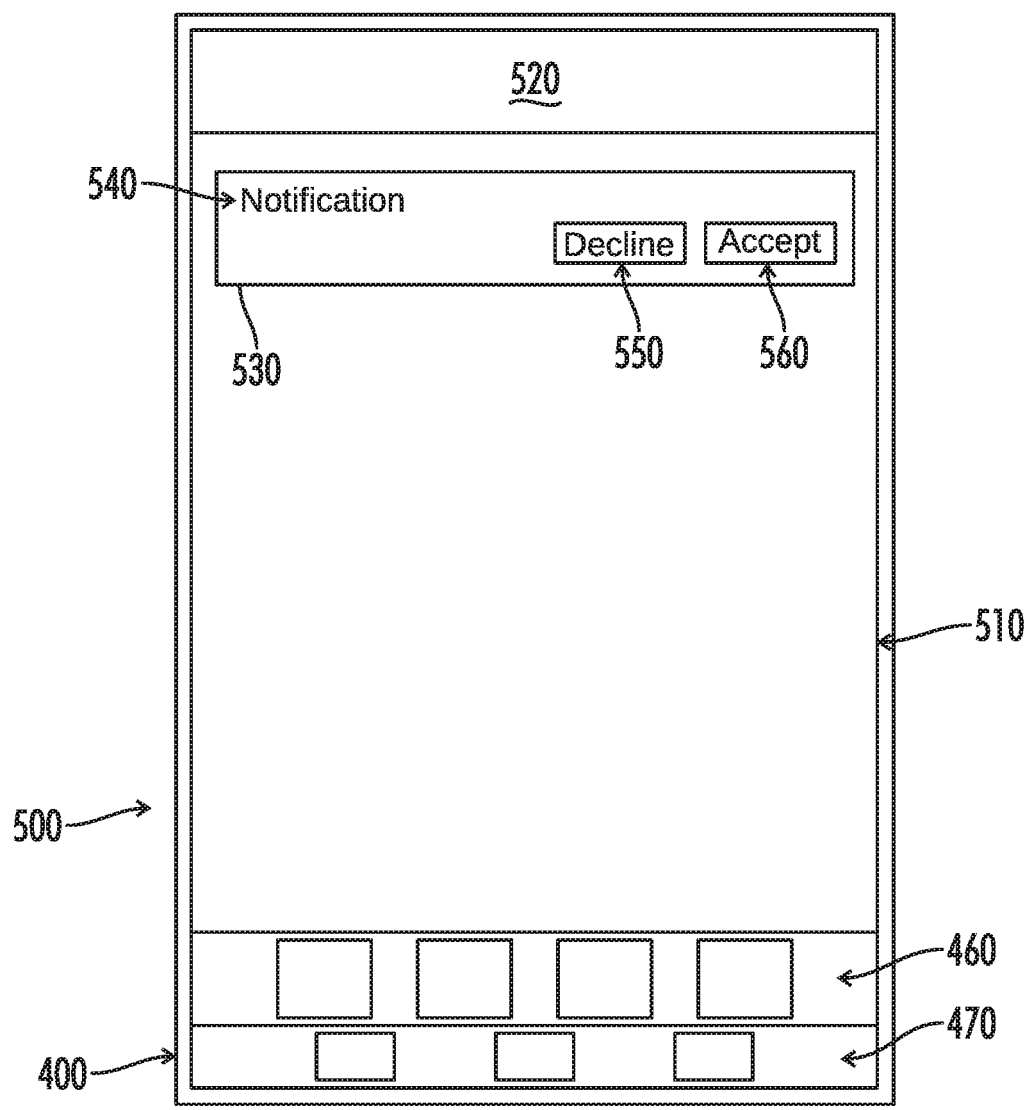
FIG. 5 illustrates an exemplary embodiment of a notification section according to aspects of the present disclosure.

FIG. 5 illustrates an exemplary embodiment of a notification section according to aspects of the present disclosure.

A system 500 includes an interface 510 displayed upon a device 400 via the PINme application module 330. The system 500 includes at least one of a header 520, a notification section 530, a notification identifier 540, an accept button 550, an accept button 560, a menu 460, and/or a default operating menu 470. The header 520 may be configured to convey at least one set of information relating a subject, topic, content, or metadata thereof of the interface 510. The notification section 530 may visually convey one or more notifications, for example a contact request in an exemplary embodiment. The notification identifier 540 may be configured to provide information regarding a notification and/or metadata corresponding thereto. One or more options in accordance with one or more notifications may be provided, for example using the decline button 550 and/or accept button 560. Although illustrated with reference to a contact request, it should be appreciated that any notification relating to the PINme application module 330 may be conveyed via the interface without departing from the spirit and scope of the present disclosure.

Figure 6:
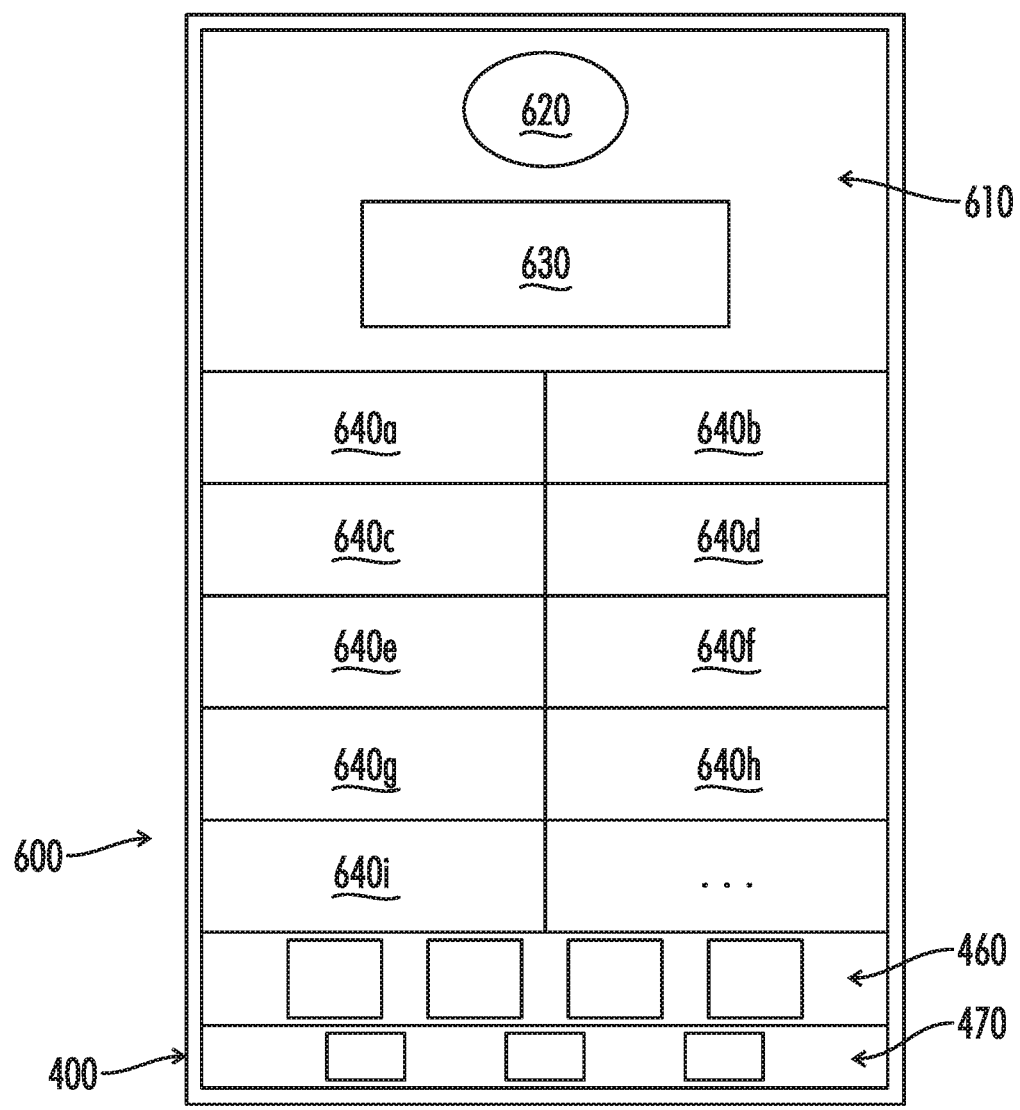
FIG. 6 illustrates an exemplary embodiment of a user information section according to aspects of the present disclosure.

FIG. 6 illustrates an exemplary embodiment of a user information section according to aspects of the present disclosure. A system 600 may include at least one of a header 610, a profile picture section 620, a profile information section 630, an information selection section 640, a menu 460, and/or a default operating menu 470. The profile picture section 620 may be configured to visually convey a predetermined and/or dynamic visual representation corresponding to a user, and entity, or information relating thereto. The profile information section 630 is configured to visually convey at least one of information and/or metadata relating to information associated with a user or entity using the PINme application module 330. The information selection section 640 may be configured to permit a user or entity using the PINme application module 330 to selectively associate one or more sets of information with a particular icon 640*a-i* and/or to access at least one set of information and/or external link corresponding to a respective icon 640*a-i*.

Examples of icons capable of accessing or otherwise associating user information with a respective icon include access to and/or control of information relating to a plurality of information sources and sets. For example, various icons 640*a-i* may directly link to one or more sources previously associated with a user or entity. Examples of sources capable of linking within the information selection section 640 include, but are not limited to, a Facebook profile 640*a*, a Twitter profile 640*b*, an Instagram profile 640*c*, a LinkedIn profile 640*d*, a Snapchat profile 640*e*, a WhatsApp profile 640*f*, an internet browser 640*g*, a YouTube profile 640*h*, a Venmo profile 640*i*, or any other external linkable information source. As noted above, any social media profile, information, provider, or source may be used via the application module 330, in addition to any other source of data and/or information. At least a portion of the contents of the information selection section 640 may be predetermined and/or may be customizable based at least in part upon user-provided account information and/or dynamically determined or suggested sources.

The information selection section 640 may be configured such that when a user selects an icon therewithin, the electronic device 310 operated by the user is caused to access information relating to the selected icon, either within the PINme application module 330 or external to the PINme application module 330.

Figure 7:
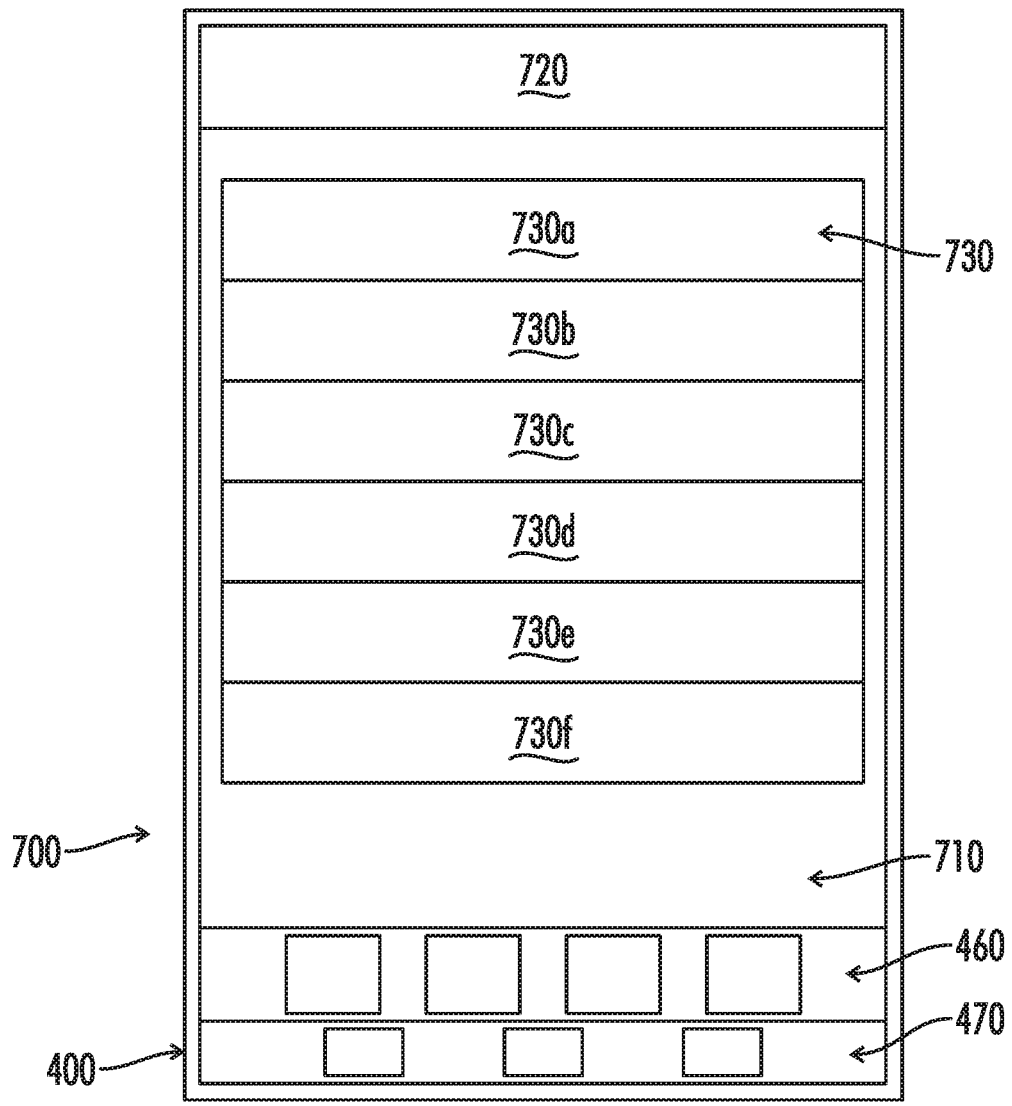
FIG. 7 illustrates an exemplary embodiment of a settings section according to aspects of the present disclosure.

FIG. 7 illustrates an exemplary embodiment of a settings section according to aspects of the present disclosure. The system 700 includes an interface 710 visually displayed on the device 400 via the PINme application module 330. The interface 710 includes at least one of a header 720, a settings selection section 730, a menu 460, and/or default operating menu 470. The header 720 may be configured to visually convey at least one setting information or metadata associated therewith. The settings selection section 730 may include one or a plurality of options for a user to view information or metadata and/or to view or edit at least one setting associated with the user, a device associated with the user, and/or the PINme application module 330. In an exemplary embodiment, the settings selection section 730 includes one or more of a profile visibility section 730*a*, a phone setting section 730*b*, a terms and conditions section 730*c*, a privacy policy section 730, a profile delete section 730*e*, and/or a logout section 730*f*. One having ordinary skill in the art will recognize that additional or fewer selectable sections may be implemented without departing from the spirit and scope of the present disclosure.

The profile visibility section 730*a*, when selected, may be configured to enable a user or entity to change a visibility parameter associated with at least a portion of a profile thereof. The phone setting section 730*b* may be configured such that when selected, a user or entity is enabled to modify phone information and/or any other contact tor device information. The terms and conditions section 730*c* may be configured to provide a user or entity with the terms and conditions of the PINme application module 330. The privacy policy 730*d* may be configured to provide a user or entity with the privacy policy corresponding to the PINme application module 330. The profile delete section 730*e* may be configured, when selected, to enable a user or entity to view and/or manipulate at least one user profile setting, such as an option to delete a profile for the user or entity. The logout section 730*f* is configured, when selected, to log an active user or entity of the PINme application module 330 out of their current session.

Figure 8:
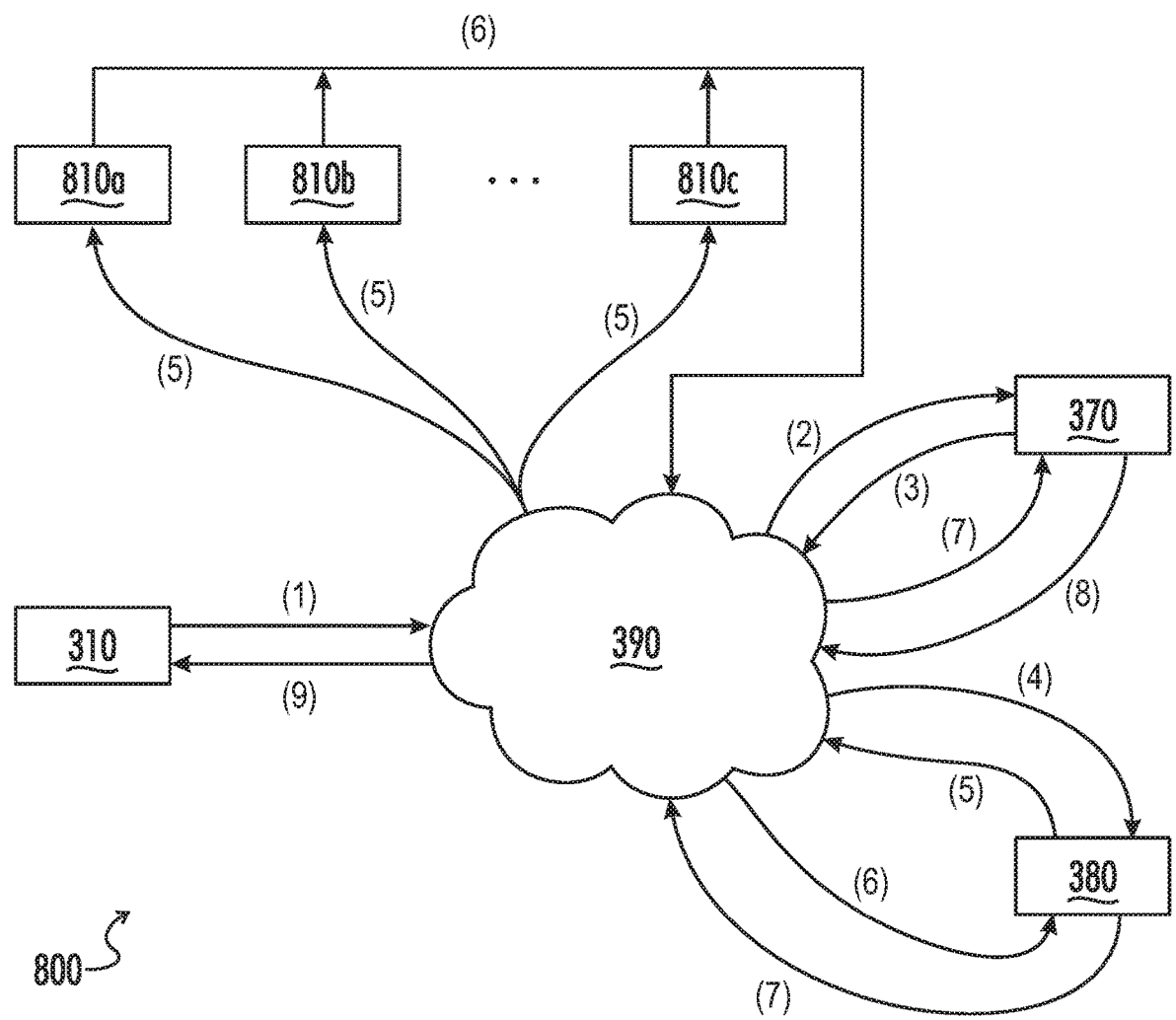
FIG. 8 illustrates an exemplary embodiment of a combined functional network diagram and communication scheme of a system according to aspects of the present disclosure.

FIG. 8 illustrates an exemplary embodiment of a combined functional network diagram and communication scheme of a system according to aspects of the present disclosure. The system 800 includes a first communication (1) from the electronic device 310 to the backend server 370 to register user or entity information and/or to create an account. The request (1) may be conveyed, for example via the network 390. The request is received at the backend server 370 via communication (2) from the network 390. The backend server 370 is configured to then query (3) the database server 380 to query one or more third-party services 810. Additionally or alternatively, at least one of the electronic device 310 and/or the backend server 370 may be configured to directly or indirectly query at least one third-party service 810 within the scope of the present disclosure. The request (3) from the backend server 370 is conveyed from the network 390 to the database server 380 (4). The database server 380 queries (5) at least one third-party service 810 for information relating to the user request. The at least one third-party service 810 provides a response (6) to the query (5), which is returned to the database server 380 via message (6). The database server 380 is configured to provide at least a portion of information received in or otherwise associated with the message (6) to the backend server 370 via information message (7). The backend server 370 is then configured to transmit at least one of the information message (7) and/or portion thereof, representation thereof, metadata associated therewith, and/or no response to the electronic device 310 at response (8). The response (8) Is subsequently conveyed to the electronic device 310 from the network 390 as message (9).

In operation, the message exchange of FIG. 8 provides an exemplary embodiment of a registration process for obtaining information from a third-party (e.g., a social network provider). One or more APIs associated with a third-party may be queried responsive to a user or entity providing account information in relation to the third-party. For example, a user may provide Facebook account information during a registration process. The electronic device may then convey the received Facebook account information to the backend server 370 which is configured to access one or more sets of information relating to the account information either directly or in conjunction with the database server 380. In various embodiments, the database server 380 may be configured to store at least a portion of information relating to the one or more sets of information and/or to periodically or non-periodically query the third party as to cache at least a portion of recent information relating to the account information.

Figure 9:
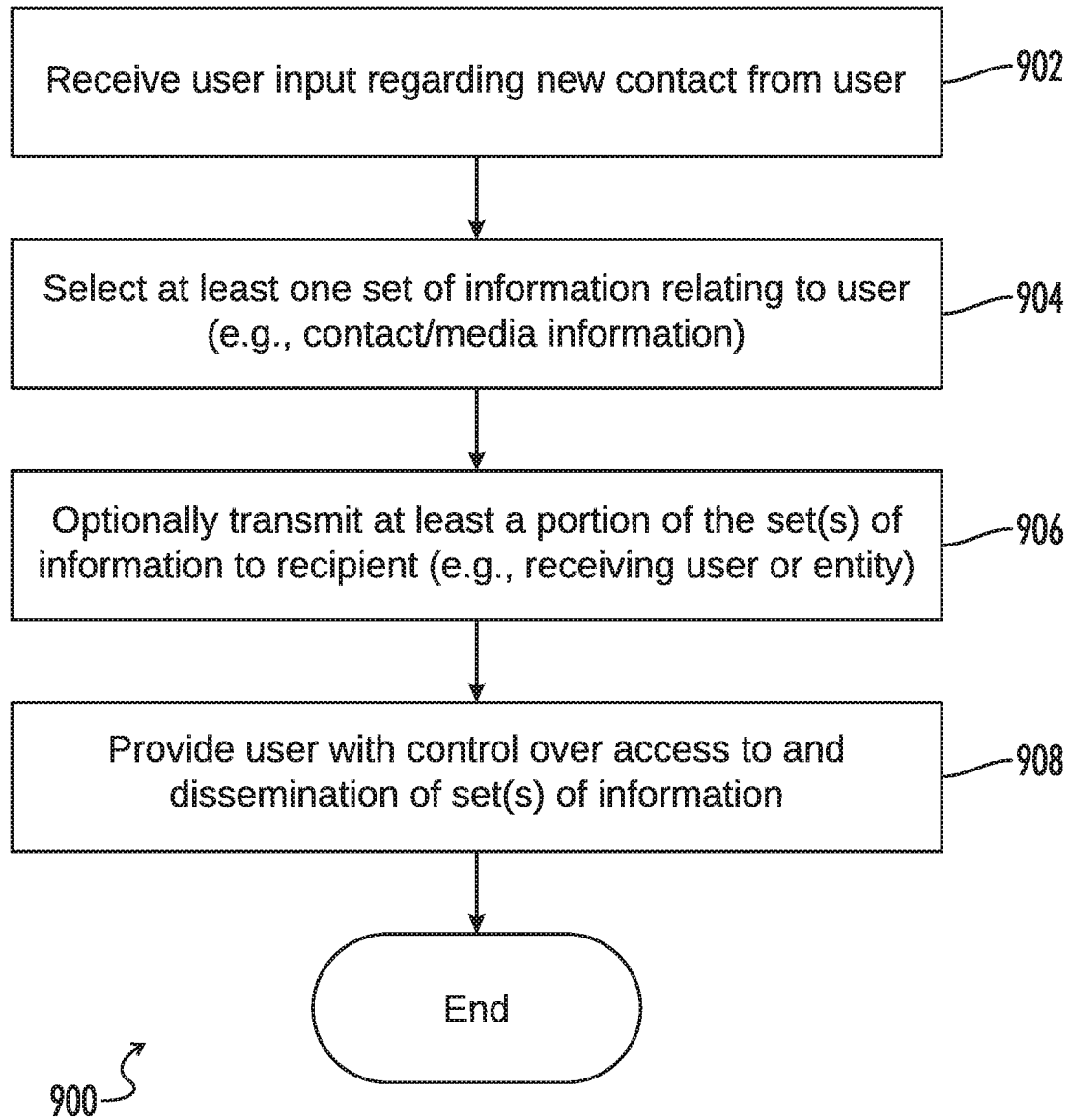
FIG. 9 illustrates an exemplary embodiment of a process for exchanging information according to aspects of the present disclosure.

FIG. 9 illustrates an exemplary embodiment of a process for exchanging information according to aspects of the present disclosure. The process 900 begins at a step 902 by receiving user input regarding a new contact from another user. The input may include a notification of a request from another user in an exemplary embodiment. The process continues to a step 904 where a user is provided with an interface enabling selection of at least one set of information relating to the user to be provided to another user or entity (e.g., the user or entity requesting connection and/or contact information). The process then continues to a step 906 where at least a portion of one or more sets of information is optionally transmitted to the recipient. For example, as described above, a user may authorize at least a portion of information to be provided to another user or entity. The selecting user may select no information or one or more sets of information authorized to provide to the other user or entity. The PINme system may then convey the authorized information or representation thereof to the receiving user or entity. At a step 908 the user or entity which selected the information to be conveyed may subsequently be provided with the ability to provide control over access to and dissemination of the set(s) of information. For example, a user, after first providing a set of information to another user or entity, may decide to remove access to all or a part of that information, which may be updated in real-time according to user selection. Similarly, the user or entity may choose to provide additional information to a receiving user or entity, which may likewise be updated in real-time to provide access to the receiving user or entity. The process 900 then ends.

Figure 10:
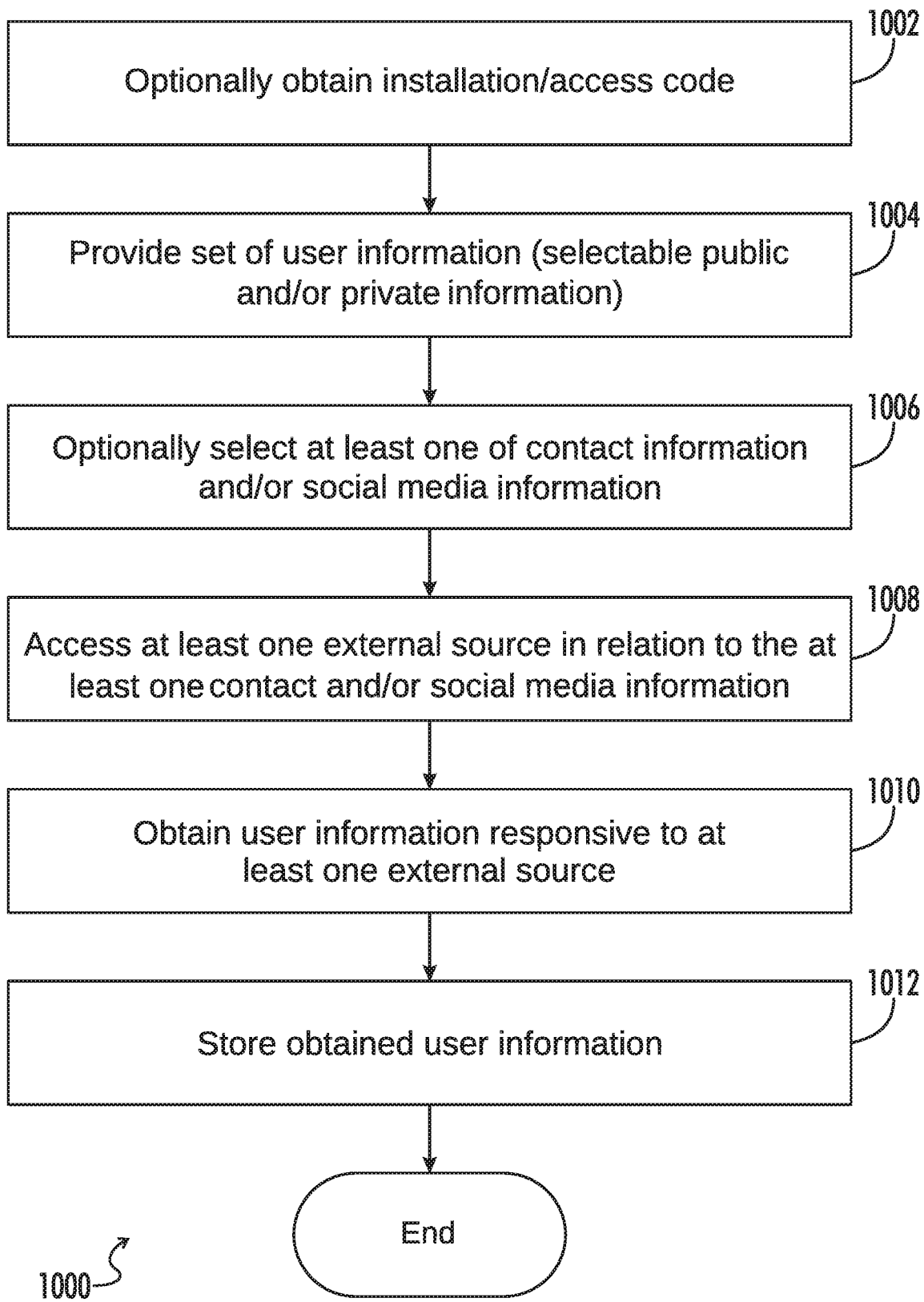
FIG. 10 illustrates an exemplary embodiment of a process for providing user information to the system according to aspects of the present disclosure.

FIG. 10 illustrates an exemplary embodiment of providing user information to the system according to aspects of the present disclosure. The process 1000 may include one or more operations associated with a first use, invitation for use, and/or use of the PINme application module 330. The process 1000 begins at a step 1002 where a user optionally obtains an installation and/or access code. In various embodiments, access to and control of a user account may be based upon a unique identifier, such as a telephone number, a predetermined identifier, a dynamically determined identifier, or any other means of associating a user with a particular request or authorization. The process continues to a step 1004 where a set of user information is provided by the user or entity using the PINme application module 330. At a step 1006, a user optionally selects at least one of contact information and/or social media information.

For example, the user or entity using the PINme application module 330 may be provided with a plurality of options for existing services and/or contact information and may further be provided with the ability to link other services and/or contact information upon registration and/or modification of existing profile information. At a step 1008 the PINme system (e.g., via at least one of the PINme application module 330, the backend server 370, and/or the database server 380) may access at least one external source (e.g., a third-party service 810) in relation to the at least one contact and/or social media information. User information may then be obtained responsive to at least one external source at a step 1010. The obtained user information may then be stored at a step 1012, for example via at least one of the electronic device 310, the backend server 370, the database server 380, or any other data storage device or scheme.

Figure 11:
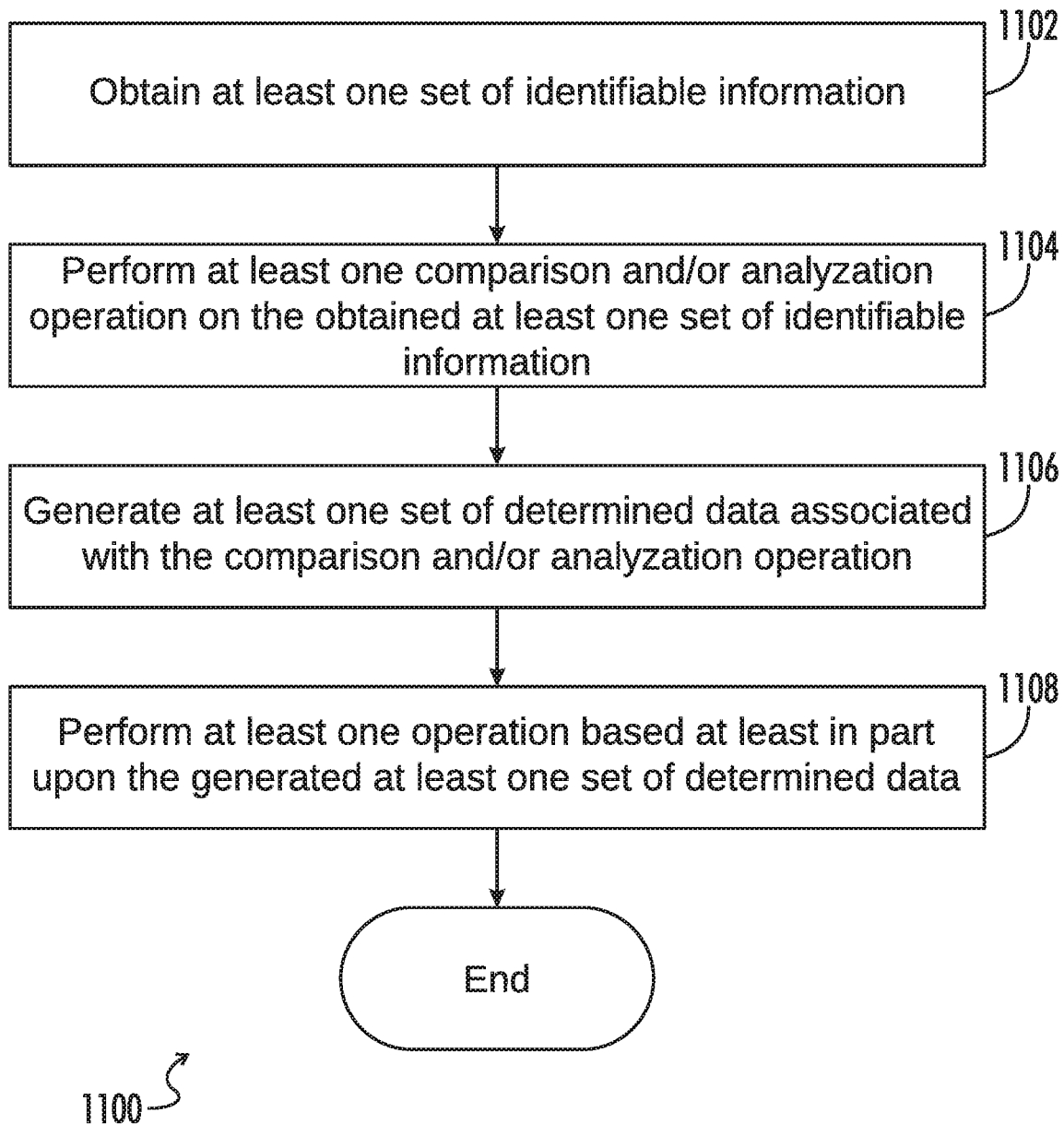
FIG. 11 illustrates an exemplary embodiment of a process for performing at least one operation in association with identifiable information according to aspects of the present disclosure.

FIG. 11 illustrates an exemplary embodiment of performing at least one operation in association with identifiable information according to aspects of the present disclosure. The process 1100 begins at a step 1102 where at least one set of identifiable information is obtained, for example by at least one of the backend server 370, the database server 380, and/or a third-party. The process continues at a step 1104 where at least one comparison and/or analyzation step is performed on the obtained at least one set of identifiable information. The step 1104 may include, for example, performing at least one comparison function, artificial intelligence operation, predictive function, or other operation configured to view a known set of data and form an expected, predicted, and/or suggested operation or function. At least one set of determined data associated with the comparison and/or analyzation operation is generated at the step 1106. The at least one set of determined data may include, for example potential or expected consumer habits or actions, association with a particular partner or advertiser, location-based services nearly a particular user or entity or group of users or entities, or any other set of information determinable from the obtained at least one set of identifiable information. The process continues to a step 1108 where at least one operation is performed based at least in part upon the generated at least one set of information. The at least one operation performed may include, for example, an advertisement, a suggested contact, a suggested set of social media profile information, or any other determinable set of information. The process 1100 then ends.

Figure 12:
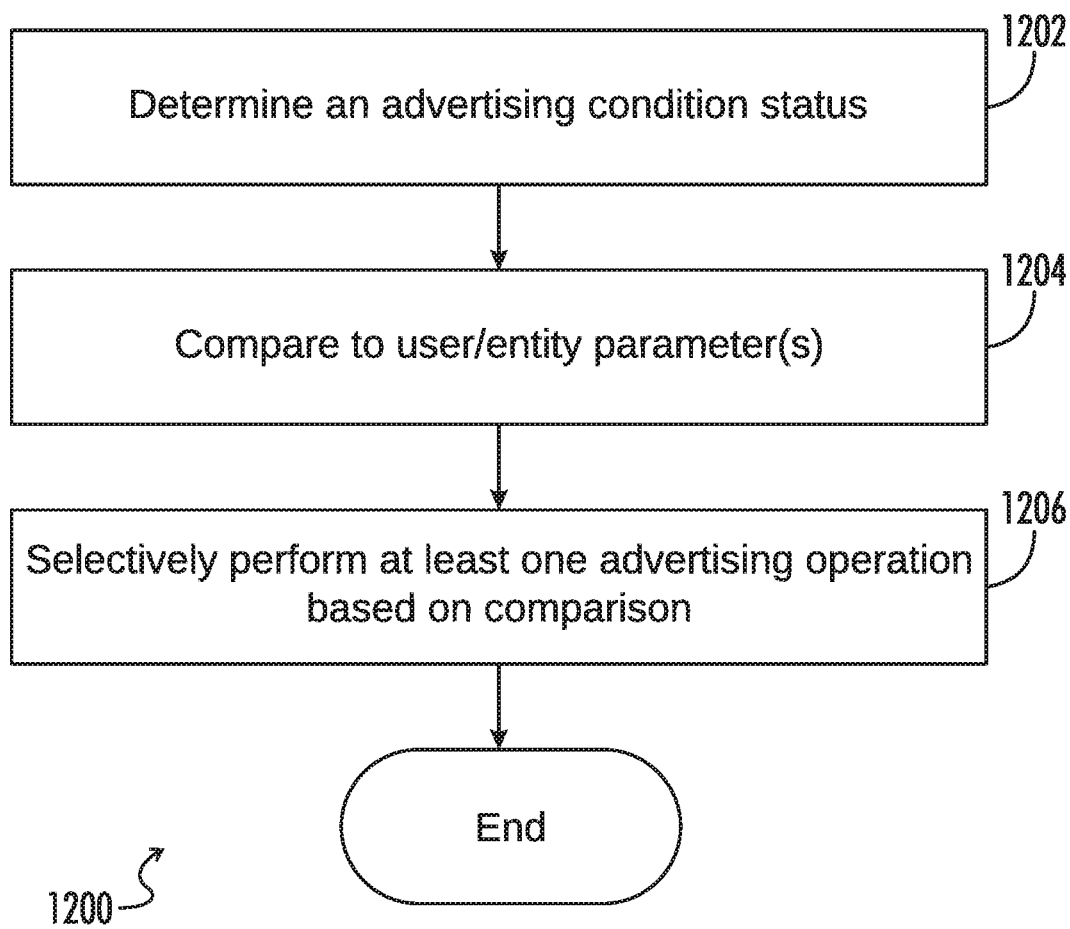
FIG. 12 illustrates an exemplary embodiment of a process for providing an advertisement operation according to aspects of the present disclosure.

FIG. 12 illustrates an exemplary embodiment of an advertisement operation according to aspects of the present disclosure. The process 1200 begins at a step 1202, where an advertising condition status is determined. The determined advertising condition status may be associated with, for example, a proximity of a user or user device with a particular location in an exemplary embodiment. The PINme system may be configured to enable proximity-based notifications and/or advertisements to users or entities. For example, a business may register a condition that users or entities of a particular or any demographic or provided, predicted, or determined condition may be associated with. At a step 1204, the advertising condition status is selectively compared to at least one user or entity parameter. The process then continues to a step 1206 where at least one advertising operation is selectively performed based at least in part upon the comparison of the step 1204. The at least one advertising operation may include, for example, at least one push message or notification, for example providing an advertisement, a discount offer, and/or other information. The process 1200 then ends.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An electronic device for accessing a contact and information exchange and management system, the electronic device comprising:
   a communication module coupleable to a network;
   a processor; and
   an application module executable by the processor to perform a plurality of operations, including:
      obtaining at least one set of dynamic information relating to at least one of a first user of the electronic device or the electronic device;
      receiving a selection of shareable information for at least a second user from the first user of the electronic device, wherein the shareable information comprises at least part of the at least one set of dynamic information;
      transmitting an indication of the shareable information from the electronic device via the communication module of the electronic device; and
      enabling subsequent input from the user modifying the shareable information or at least partially restricting access by the at least second user with respect to the shareable information.

2. The electronic device of claim 1, wherein the at least one set of information includes contact information relating to the first user of the electronic device.

3. The electronic device of claim 1, wherein the application module, when executed by the processor, is configured to perform an operation of receiving a shareable information modification selection, the shareable information modification selection relating to a previous selection of the shareable information.

4. The electronic device of claim 3, wherein the application module, when executed by the processor, is configured to perform the operations of:
   transmitting the shareable information modification selection at the electronic device and transmitting the shareable information modification selection via the communication module of the electronic device; and
   updating the shareable information obtainable by the second user of the contact and information exchange and management system responsive to the transmitting the shareable information modification selection.

5. The electronic device of claim 4, wherein the application module, when executed by the processor, is configured to perform the operation of:
   transmitting the at least one set of information to a server of the contact and information exchange and management system, the transmitted at least one set of information capable of permitting selective updating of the shareable information at the server after receiving the transmitted shareable information modification selection from the electronic device at the server.

6. A system for providing contact and information exchange and management, the system comprising:
   a network;
   a server coupleable to the network;
   a plurality of electronic devices coupleable to the network, each of the plurality of electronic devices including:
      a communication module communicatively coupleable to the network;
      a processor; and
      an application module executable by the processor to perform a plurality of operations, including:
         obtaining at least one set of dynamic information relating to a first user of a first electronic device of the plurality of electronic devices;
         receiving a selection of shareable information from the first user of the first electronic device;
         transmitting an indication of the shareable information for at least a second user from the first electronic device via the communication module of the first electronic device to the server, wherein the shareable information comprises at least part of the at least one set of dynamic information;
         obtaining the shareable information at a second electronic device of the plurality of electronic devices from the server via the communication module of the second electronic device; and
         enabling subsequent input from the user modifying the shareable information or at least partially restricting access by the at least second user or the second electronic device with respect to the shareable information.

7. The system of claim 6, wherein the server is configured to control access to the shareable information in real-time based at least in part upon receipt of the transmitted indication of the shareable information from the first electronic device by updating at least one record at the server.

8. The system of claim 6, wherein the application module, when executed by the processor of the first electronic device, is configured to perform an operation of receiving a shareable information modification selection from the first user of the first electronic device, the shareable information modification selection relating to a previous selection of the shareable information.

9. The system of claim 8, wherein the application module, when executed by the processor of the first electronic device, is configured to perform operations of transmitting the shareable information modification selection received at the first electronic device and transmitting the shareable information modification selection via the communication module of the first electronic device to the server, and wherein the system is further configured to provide updating at the server the shareable information obtainable by a second user of the second electronic device.

10. The system of claim 9, wherein the application module, when executed by the processor, is configured to perform the operation of:
transmitting the at least one set of information to the server, the transmitted at least one set of information capable of permitting selective updating of the shareable information at the server after receiving the transmitted shareable information modification selection from the first electronic device at the server.

11. A method for providing a contact and information exchange and management system, comprising:
obtaining at least one set of dynamic information relating to at least one of a first user of an electronic device of the contact and information exchange and management system or the electronic device;
receiving a selection of shareable information for at least a second user from the first user of the electronic device, wherein the shareable information comprises at least part of the at least one set of dynamic information;
transmitting an indication of the shareable information from the electronic device via a communication module of the electronic device; and
enabling subsequent input from the user modifying the shareable information or at least partially restricting access by the at least second user with respect to the shareable information.

12. The method of claim 11, wherein the at least one set of information includes contact information relating to the first user of the electronic device.

13. The method of claim 11, further comprising:
receiving a shareable information modification selection, the shareable information modification selection relating to a previous selection of the shareable information.

14. The method of claim 13, further comprising:
transmitting the shareable information modification selection at the electronic device and transmitting the shareable information modification selection via the communication module of the electronic device; and
updating the shareable information obtainable by the second user of the contact and information exchange and management system responsive to the transmitting the shareable information modification selection.

15. The method of claim 14, further comprising:
transmitting the at least one set of information to a server; and
selectively updating the shareable information at the server after receiving the shareable information modification selection from the electronic device at the server.

* * * * *